United States Patent [19]
Beringer et al.

[11] Patent Number: 5,629,030
[45] Date of Patent: May 13, 1997

[54] EXTRUSION DEVICE HAVING POSITION CONTROL

[75] Inventors: Andreas Beringer, Darmstadt; Karl Funk; Erhard Haun, both of Griesheim, all of Germany

[73] Assignee: Roehm GmbH Chemische Fabrik, Darmstadt, Germany

[21] Appl. No.: 616,463

[22] Filed: Mar. 15, 1996

[30] Foreign Application Priority Data

Mar. 18, 1995 [DE] Germany .................. 29 50 4694.5

[51] Int. Cl.$^6$ ............................. B65H 23/02; B29C 47/34
[52] U.S. Cl. ...................... 425/135; 226/15; 425/169; 425/377
[58] Field of Search ............................ 425/135, 140, 425/169, 327, 377; 226/3, 15, 21

[56] References Cited

U.S. PATENT DOCUMENTS

| | | | |
|---|---|---|---|
| 2,777,069 | 1/1957 | Saeman | 226/21 |
| 2,842,361 | 7/1958 | Miller | 226/21 |
| 3,491,562 | 1/1970 | Kajiwara | 226/21 |
| 4,407,439 | 10/1983 | Buss | 226/21 |
| 4,836,744 | 6/1989 | Karl et al. | 425/140 |
| 4,848,632 | 7/1989 | Mack et al. | 226/21 |

FOREIGN PATENT DOCUMENTS

| | | |
|---|---|---|
| 0429161 | 5/1991 | European Pat. Off. . |
| 0501604 | 9/1992 | European Pat. Off. . |
| 3339886 | 5/1985 | Germany . |
| 3814596 | 11/1988 | Germany . |
| 9415619 | 1/1995 | Germany . |
| 5-42579 | 2/1993 | Japan . |

*Primary Examiner*—James P. Mackey
*Attorney, Agent, or Firm*—Oblon, Spivak, McClelland, Maier & Neustadt, P.C.

[57] ABSTRACT

In the extrusion of thermoplastic deformable plastics, especially the manufacture of plastic plates, an automatic regulation apparatus on the roller discharge ensures that the extruded plastic plate is directed horizontally along the device center after leaving the roller calender. The apparatus contains a sensor unit which transmits a position signal for the horizontal position of the plastic plate to a controller which, when a deviation of the plastic plate center from the device center occurs, activates two pneumatic plug cylinders such that the plug force of the haul-off rolls changes the roller diameter and thereby guide the conveyed direction of the plastic plate.

9 Claims, 3 Drawing Sheets

EXTRUSION DEVICE HAVING POSITION CONTROL

BACKGROUND OF THE INVENTION

1. Field of the Invention

The present invention relates to an extrusion technique for thermoplastic deformable plastics, especially the manufacture of plastic plates and foils. It provides automatic regulation of the roller conveyor so as to guide the extruded plastic plate or foil through the center of the extrusion device after the plate or foil leaves the roller calender.

2. Description of the Related Art

Extrusion devices for thermoplastic plastics are known. The melted polymer exits the extruder over a wide slit nozzle and runs through a roller calender, whereby the thickness of the extruded plastic is established. The plastic may be in the form of plates, foils or similar bodies, hereinafter simply referred to as plates. The plastic plate leaves the roller calender in a considerably rigid condition. It runs horizontally over a gravity-roller conveyor for further cooling and is then taken over by two haul-off rolls which control the running direction of the plastic plate, where the running direction is the direction of movement since the plastic plate left the calender.

If the plastic plate is not symmetric to the geometric center of the device, but off-set to the right or left, there may result disturbances in subsequent devices such as edge cutting saws, transverse separating saws, staplers or spoolers. The resulting plate section would be, for example, not right-angled and thereby would have to be discarded. Therefore, the guiding of the plastic plate through the horizontal center of the device must be constantly supervised.

If the plastic plate deviates from the centered course, the haul-off rolls must be opened so that it can be pulled into the correct position. Another possibility is to regulate the angle of the haul-off rolls relative to the conveyor direction. For the exact in-regulation or after-regulation, a mechanical controller must be built in.

Also known is so-called rotation frame regulation (Erhard and Leimer Company, Augsburg, Austria). It guides foils by oscillating the rotation frame. A changing rolling-up of the foil can be achieved by running oscillation of the rotation frame but is not appropriate for guiding plastic plates.

Different measuring sensors are known for measuring the plastic plate width, including thermographic or mechanical measuring sensors, and infrared measuring sensors which scan in a direction transverse to the running direction to determine the plate edges (Octagon Company, Würzburg, Germany). While these techniques can detect the width of the plastic plate, they will not be accurate unless the plate is moving through the center of the device. Disturbances caused by sideways deviation of the plastic plate must therefore be eliminated.

SUMMARY OF THE INVENTION

It is an object of the present invention to provide a device that automatically guides the plastic plate through the horizontal center of the extrusion device after it leaves the calender so that continuous observation and correction can be eliminated.

Tolerances for the supernatant on both sides of the plastic plate are therefore equal and can be maintained small and the edge cut residue can be decreased. Automatic regulation of the plastic plate in the center of the device is especially valuable at the beginning of the extrusion course, because the attention of the service personnel in this critical phase of the production can then be dedicated to other parameters of the production. A rapid reaction of the regulation is especially important with thin plates (for example, 0.5–3 mm), because even a small deviation from the device center can be fatal at the high plate speeds which are there possible.

It is an additional object of the invention to provide a device wherein when symmetrical constriction or symmetrical widening of the plastic plate occurs because the plate thickness changes in the roller calender, the regulation mechanism reacts correctly (that is, there is no change in the manipulated variables) and the position of the plastic plate center relative to the device center remains unchanged.

The above and other objects are solved according to the invention by an apparatus for regulating a running direction of an extruded plastic plate being conveyed on an extrusion device after the plate leaves a calender of the extrusion device. The apparatus comprises two parallel haul-off rolls positioned to form a roller slit through which the conveyed plastic plate passes, the ends of the haul-off rolls being supported by bearings; position regulators mounted for independently adjusting the positions of the ends of at least one of said haul-off rolls such that a plug force of the haul-off rolls on opposite sides of the conveyed plastic plate may be adjusted; a sensor device positioned for determining a center of the conveyed plastic plate; and a controller responsive to the determined center of the conveyed plastic plate and operatively connected to the regulators for adjusting the plug force such that the center of the conveyed plastic plate substantially coincides with a center of the extrusion device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

The invention will be further explained with reference to the attached drawings, but is not limited to the illustrated embodiment.

Figure 1:
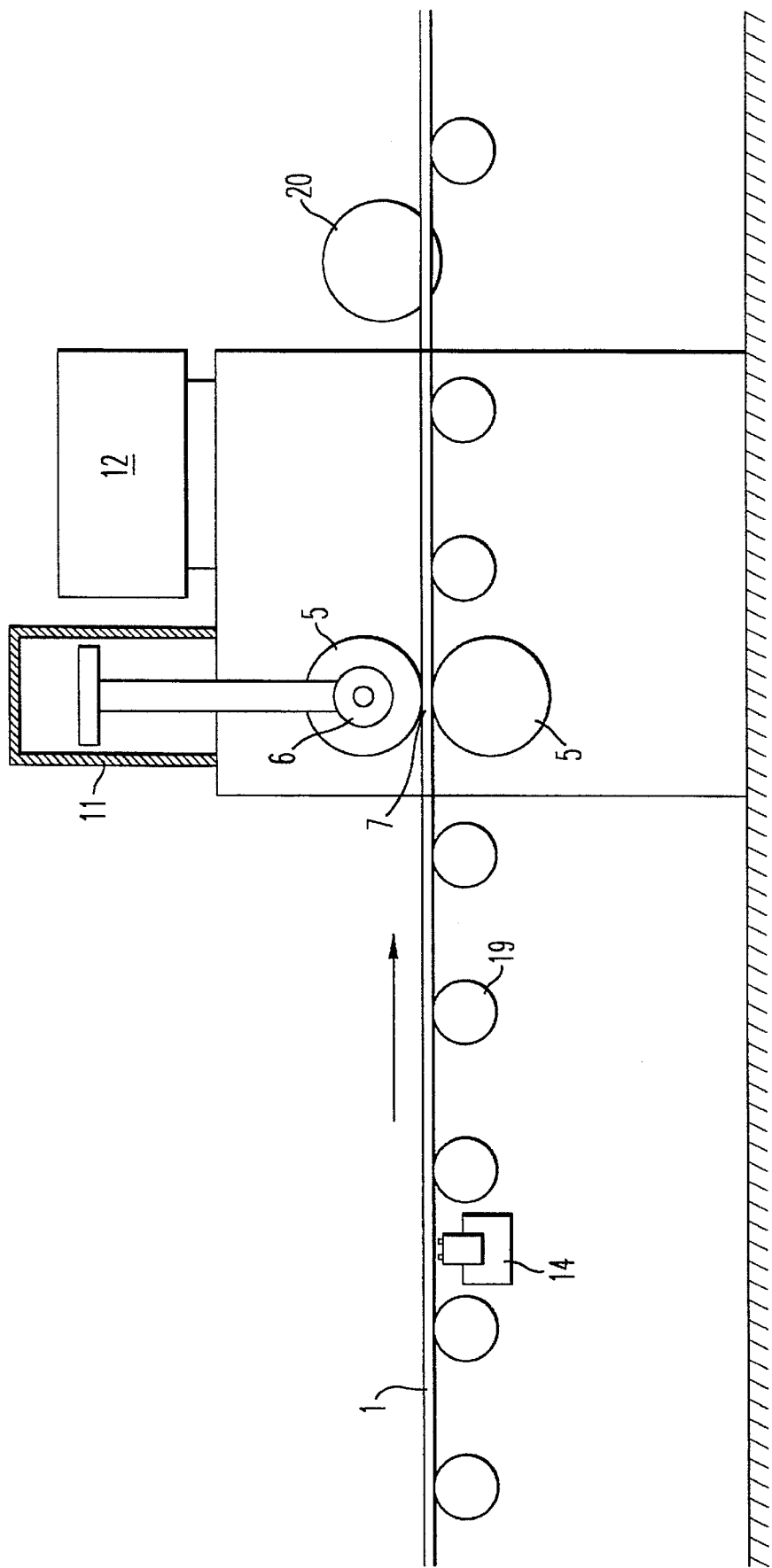
FIG. 1 shows a portion of the extrusion device in the area of the haul-off rolls.

The extrusion device according to the invention consists of two parts, a scanning unit and a regulation unit. In FIG. 1 the direction of movement of a plastic plate 1 through the extrusion device in the area of haul-off rolls 5 is indicated by an arrow. The plastic plate 1 which has left the calender device (not shown) is horizontally supported and conveyed by rolls 19 of a gravity-roller conveyor past the haul-off rolls 5 which are supported at their ends by roller bearings 6 and define a roller slit 7. A regulator 11 controlled by a controller 12 regulates the width of the slit. An edge cutting saw 20 is positioned downstream of the haul-off rolls. A sensor unit with sensors 14 is positioned between two of the rolls 19 and in proximity to the plate 1.

The regulators 11 are pneumatic plug cylinders built into both sides of the haul-off rolls 5 and act on the roller bearings 6 to vary the plug force applied by the haul-off rolls 5. The haul-off rolls 5 are normally rubber which facilitates conveying of the plastic plate and variations of the plug force. They are preferably arranged one above the other. An increased plug force on one side means a small decrease of the roll diameters and, therefore, a decreased perimeter speed of the rolls at this location. The plastic plate is therefore transported slower on this side of the haul-off rolls, whereby the whole plastic plate is pulled to one side. It is therefore possible to cause lateral movement of the plate by adjusting the plug force on the haul-off rolls 5.

Figure 2:
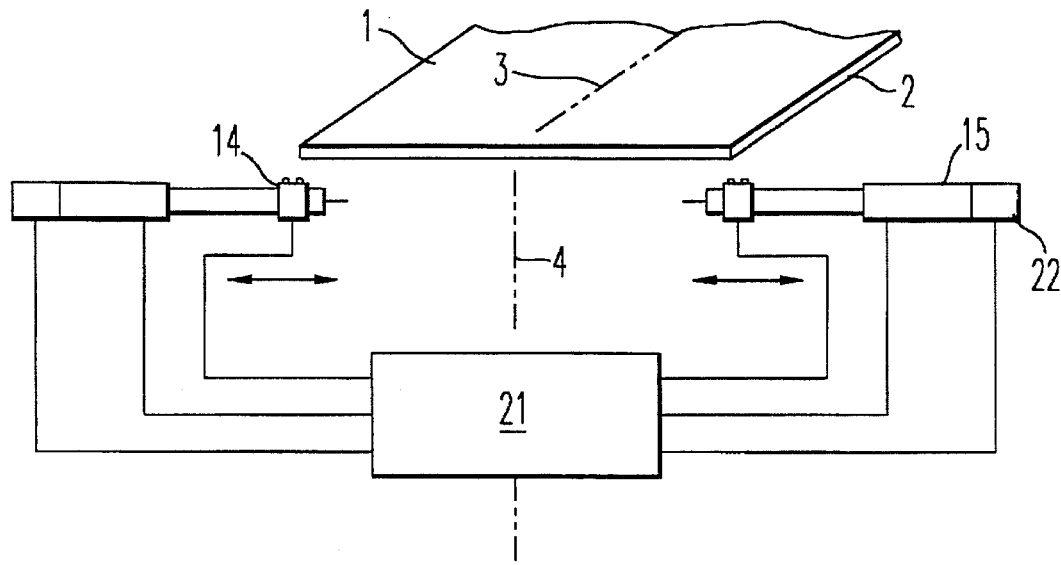
FIG. 2 schematically shows a section transverse to the conveying direction in the area of the sensor unit.

As seen in FIG. 2, the plastic plate 1 has a plate edge 2 and a center 3 which is positionable relative to the center 4, which is the longitudinal center line of the extrusion device relative to the conveying direction. The sensors 14 are electrically connected to feed sensing data to the motor control unit 21 and the controller 12. The motor controller also receives electrical signals from the potentiometers 22 and controls the actuators 15.

Figure 3:
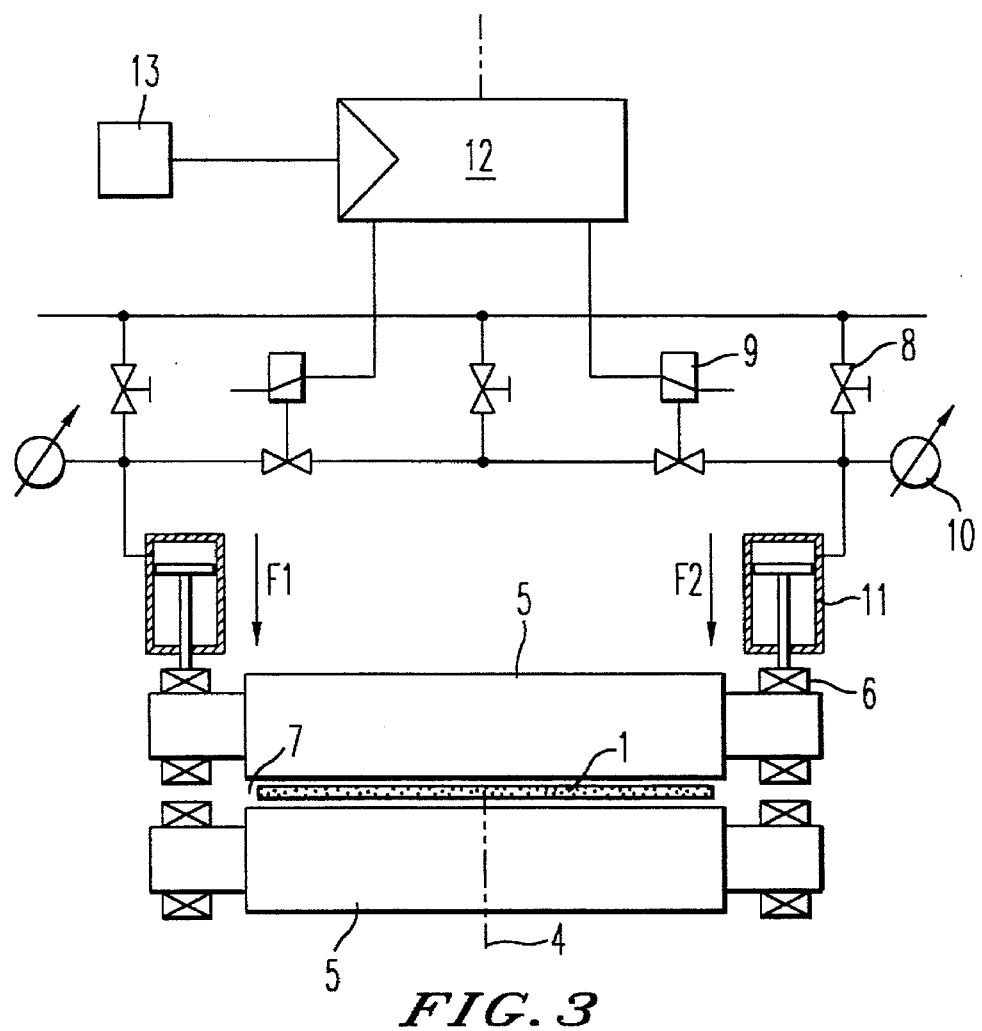
FIG. 3 schematically shows a section transverse to the conveying direction in the area of the haul-off rolls.

As seen in FIG. 3, the pneumatic systems of the regulators 11 are controlled by the electrical controller 12 which acts on the solenoid valves 9. The controller consists mainly of a three-point step controller 12 with a proportional-integral (PI) behavior. Pressurized air supplied to the chambers of the regulators 11 may be selectively released by the solenoid valves 9 under the control of the controller 12 in order to control the plug pressure. A manometer 10 and hand valves 8 are provided for manual adjustment. A hand/automatic lever 13 may be used to switch between automatic and manual control.

The scanning unit is used to determine the distances between the plate edges and the extrusion device center. As a rule, two identical sensors 14 are positioned for recognition of the left and right edges of the plastic plate. In the simplest case, they can be contact sensors that are constantly held at the plate edge by spring pressure. However, optical sensors, for example two-way infrared reflection sensors, are preferred for plastic plates with flat or flat structured surfaces and different coloring and degrees of transparency. For plates with a rough surface, transillumination sensors using laser rays (one-way principle) are preferred.

Figure 4:
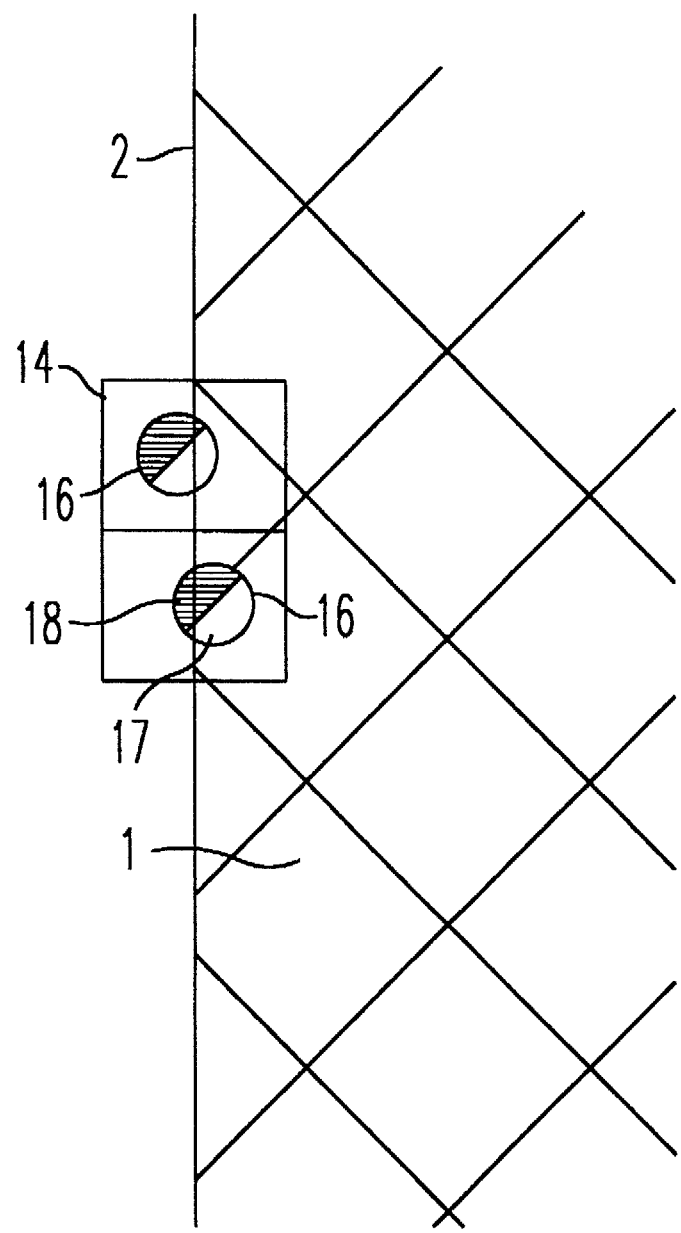
FIG. 4 shows one of the plate edges of the plastic plate.

The sensor unit consists mainly of four sensors 14 (two for each side) each with a light conductor 16, two of the actuators 15 each with a potentiometer 22, and the motor control unit 21. Each light conductor has a sender surface 17 and a receiver surface 18. The light conductor pairs are preferably attached one behind the other in the conveyor direction. They lie almost parallel to the plate edge at intervals of 0.5–1 mm with respect to one another and transversely to the conveyor direction (see FIG. 4). This arrangement ensures a high response sensitivity for the position changes. The light conductor pairs are driven toward the plate edge by means of a correspondingly positioned motor control until the first light conductor is covered by the plastic plate and the second light conductor remains uncovered. FIG. 4 schematically shows one of the two plate edges 2 of the plastic plate 1 with the optic sensors 14 lying below and showing the light conductor 16 with the sender and receiver surfaces 17, 18 seen from above.

Preferably, the optical sensors can be driven in a direction transverse to the direction of movement of the plate edges 2 during the extrusion duration. This is done via the actuator 15 controlled by the motor driving unit 21. The sensors 14 emit a signal indicating the presence of a plate edge. The potentiometers 22, which are coupled mechanically to the actuators 15, detect the position of the sensors, and so the plate edges when the plate edges are detected by the sensors. The position signals emitted by both potentiometers are summed by additive coupling to produce a signal indicative of the position of the plate center, which signal is fed to the controller 12.

If no plastic plate is detected at a given position of the sensors 14, then they move toward the device center to a rest position (stop). The additive coupling of the potentiometer signals has the advantage that symmetrical widening or constriction of the thickness of the plastic plate, as may occur when there is a change in the thickness of the plastic plate, does not activate the regulation mechanism, which is desirable since the position of the plastic plate center opposite to the device center then remains unchanged.

The sensor unit is preferably mounted under the plastic plate between the rolls of the gravity-roller conveyor to protect it from damage by collision with the extrusion device.

It was found that the use of a rotation point step controller, preferably set as a discontinuous controller, presents the best solution for the regulation to the plate center. The use of a continuous controller 12 is also possible. The signal which is emitted by the sensor unit 14, and which corresponds to the position of the center of the plastic plate, serves as actual value for the controller 12. A desired value which corresponds exactly to a centered position of the plastic plate is also fed to, or programmed in, the controller 12. As long as the desired value and the actual value of the plate center coincide with one another within pregiven limits, the controller does not change the plug force of the haul-off rolls. If the center of the plastic plate moves away from the device center, the sensor unit 14 determines this and the correspondingly changed signal is transmitted to the controller as the actual value. Based on the deviations of the actual value from the desired value, the plug force of the haul-off rolls is modified. This continues until the actual value corresponds again to the desired value, that is, the center of the plastic plate has again reached the center of the extrusion device. Depending on the negative or positive deviation of the desired value, the regulator determines on what side of the haul-off rolls the plug force must be increased.

The response sensitivity can be set in such manner that a deviation of the plate center of ±1 mm is not exceeded. For routine operation, position deviations of ±2 mm can be tolerated.

The conveying of the plate is preferably horizontal. But conveying directions which are vertical or at an angle to the horizontal are also possible.

The apparatus is useful for any desired plate width. Common plate widths lie between 0.5 to 2.5 m. Also, the plate thickness can be varied within wide limits, for example, between 0.5 and 25 mm. The composition of the extrusion material does not matter; the apparatus according to the invention can be used for the production of any extrudable thermoplastic plastic. Plates of polycarbonate, polymethyl acrylate, polymethyl methacrylimide, polypropylene and others are possible (compare herewith, for example, E. C. Bernhardt, Processing of Thermoplastic Materials, Reinhold Publishing Corporation, New York, 1959). Plates with flat, flat structured or rough surfaces, with different coloring and degree of transparency, can also be used.

The control or regulation of the course of the plate according to the invention is not only possible with extrusion processes, but also with other processes where plates are used, like coating and laminating processes, as well as lining processes.

EXAMPLE

In the following example, the parameters for guiding a plate with a thickness of 3 mm and a width of 2000 mm in the extrusion device are described. The plate speed is 1.66 m/min. The plate position control begins where the plate leaves the calender. The distance between the calender and the haul-off rolls is 10 m. The pneumatic pressure of the plug cylinder 11 is 3 bar.

Under these conditions, extrusion was carried out for 100 hours. Disturbances did not appear, even though the plate thickness was varied many times, including a total of 12 times in the range of 2 to 10 mm. The maximum deviation of the plastic plate from the extrusion device center amounted to ±2 mm.

Obviously, numerous modifications and variations of the present invention are possible in light of the above teachings. It is therefore to be understood that the invention may be practiced otherwise than as specifically described herein.

What is claimed is:

1. An apparatus for regulating a running direction of an extruded plastic plate being conveyed on an extrusion device after the plate leaves a calendar of the extrusion device, comprising:

two parallel haul-off rolls positioned to form an elongate roller slit through which the conveyed plastic plate passes, the ends of the haul-off rolls being supported by bearings;

a sensor unit for sensing a position of a plastic plate being conveyed in a running direction;

position regulators mounted for independently adjusting the positions of the ends of at least one of said haul-off rolls such that a plug force of the haul-off rolls on opposite sides of the conveyed plastic plate may be adjusted; and a controller responsive to the sensed position of the conveyed plastic plate and operatively connected to the regulators for adjusting the plug force.

2. The apparatus according to claim 1, wherein said sensor unit is positioned for determining a center of the conveyed plastic plate, and wherein said controller is responsive to the determined center of the conveyed plastic plate and is operatively connected to the regulators for adjusting the plug force such that the center of the conveyed plastic plate substantially coincides with a center of the extrusion device.

3. The apparatus according to claim 2, wherein the running direction of the plastic plate is horizonal.

4. The apparatus according to claim 2, wherein the sensor unit is arranged between the calender and the haul-off rolls.

5. The apparatus according to claim 2, wherein said sensor unit comprises:

two sensors on each side of the plastic plate, the sensors being mounted for movement toward or away from edges of the plastic plate; and potentiometers mounted for determining the positions of said sensors and outputting to said controller a signal indicative of a center of the plastic plate, wherein said controller adjusts the plug force when the signal from said potentiometers deviates from a value corresponding to a center of said extrusion device.

6. The apparatus according to claim 5, wherein said two sensors on each side of the plastic plate are optical sensors, including actuators for moving the sensors toward or away from edges of the plastic plate.

7. The apparatus according to claim 6, wherein said optical sensors each comprise light conductors arranged in such a manner that the light conductor of each said sensor may be covered by the plastic plate while the other light conductor of said sensor remains uncovered.

8. The apparatus according to claim 7, wherein the plastic plate is conveyed on a roller conveyor and said optical sensors are mounted between the conveyor rollers and below the plastic plate.

9. The apparatus according to claim 2, wherein said controller comprises means for maintaining deviations between the center of the plastic plate and the device center within ±2 mm.

* * * * *